United States Patent
Hantman

(10) Patent No.: US 10,360,618 B1
(45) Date of Patent: Jul. 23, 2019

(54) METHOD TO INCREASE SCOPE OF SUBSCRIPTION AND DISTRIBUTION OF INTEROPERABLE SCORM AND EXPERIENCE API WEB BASED LEARNING

(71) Applicant: Kenneth Stuart Hantman, Huntingdon Valley, PA (US)

(72) Inventor: Kenneth Stuart Hantman, Huntingdon Valley, PA (US)

( * ) Notice: Subject to any disclaimer, the term of this patent is extended or adjusted under 35 U.S.C. 154(b) by 0 days.

(21) Appl. No.: 16/013,691

(22) Filed: Jun. 20, 2018

Related U.S. Application Data

(63) Continuation-in-part of application No. 14/753,194, filed on Jun. 29, 2015, now abandoned.

(60) Provisional application No. 61/998,804, filed on Jul. 9, 2014.

(51) Int. Cl.
| | |
|---|---|
| *G06F 17/30* | (2006.01) |
| *G06Q 30/06* | (2012.01) |
| *G09B 5/06* | (2006.01) |

(52) U.S. Cl.
CPC ......... *G06Q 30/0635* (2013.01); *G09B 5/065* (2013.01)

(58) Field of Classification Search
CPC ................................................ G06Q 30/0635
USPC ....................................................... 705/26.81
See application file for complete search history.

(56) References Cited

U.S. PATENT DOCUMENTS

| | | | |
|---|---|---|---|
| 6,249,281 B1* | 6/2001 | Chen | G06F 3/0483 715/723 |
| 6,516,340 B2 | 2/2003 | Boys | |
| 6,567,813 B1* | 5/2003 | Zhu | G06Q 10/10 707/802 |
| RE38,609 E | 10/2004 | Chen | |
| 6,909,708 B1* | 6/2005 | Krishnaswamy | H04L 12/1813 370/352 |
| 7,263,710 B1* | 8/2007 | Hummel, Jr. | G06F 19/324 725/86 |
| 7,733,366 B2* | 6/2010 | Beavers | G09B 5/00 348/14.08 |
| 9,166,714 B2* | 10/2015 | Barve | H04H 60/64 |
| 2003/0194690 A1* | 10/2003 | Wessner | G09B 7/00 434/350 |
| 2014/0057239 A1 | 2/2014 | Vehovsky et al. | |

* cited by examiner

*Primary Examiner* — Sheree N Brown

(57) ABSTRACT

A method for a seller of educational materials including webisodes, dealing with loss prevention, sales and customer service, to sell such materials via security integrators, payroll and human resource outsourcers which are not primarily involved in the business of sales of such training materials to end-user businesses that are the clients of the integrators and outsourcers. Accordingly a form of tangential distribution is practiced capitalizing on a vast threshold between demand and supply and availability and economic feasibility of producing such high quality materials. The method involves identification of tier resellers, selling of a subscription basis training series mainly accessible via password protected online access to, generally, SCORM and Experience API conformant, formatted high quality video materials.

8 Claims, 2 Drawing Sheets

Figure 1:
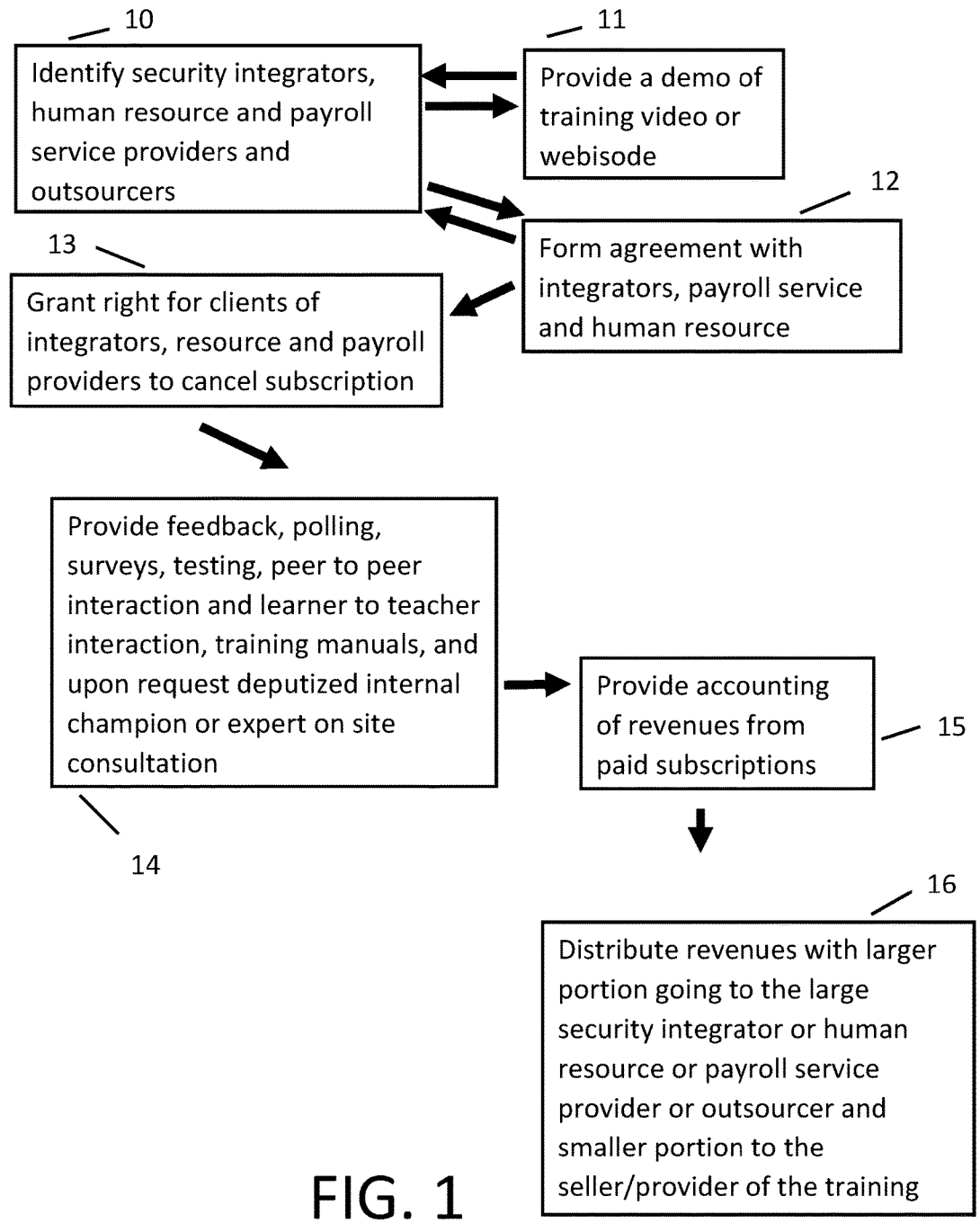

METHOD TO INCREASE SCOPE OF SUBSCRIPTION AND DISTRIBUTION OF INTEROPERABLE SCORM AND EXPERIENCE API WEB BASED LEARNING

CROSS-REFERENCE TO RELATED APPLICATIONS

This application is a Continuation-In-Part of and claims priority from non-provisional U.S. Ser. No. 14/753,194, filed Jun. 29, 2015, which itself claims priority from provisional U.S. Ser. No. 61/998,804 filed Jul. 9, 2014, the entireties of both of which are hereby incorporated by reference herein.

FEDERALLY SPONSORED RESEARCH

Not Applicable

SEQUENCE LISTING OF PROGRAM

Not Applicable

FIELD OF INVENTION

This invention relates to a method for sales and distribution of employee training with web accessible SCORM and Experience API packages containing training videos, specifically to an improvement in methods resulting in a large increase in sales volume. "SCORM" is the commonly used name and acronym for "Searchable Content Object Reference Model, and "Experience API" is a name (not acronym). They are both sets of specifications for software for e-learning.

BACKGROUND OF THE INVENTION

Industry spends approximately $1200 per employee per year on training (in 2014). Various methods of training include in person presentations, consulting, webinars, books, c.d.'s and pamphlets. An outside presenter or creator of material or seller will generally sell this to a company's Human Resources Department which generally handles employee training, or to a particular department such as Sales, Safety & Security, Production and so forth, concerned with the topic covered.

A great inefficiency was discovered in this system and this led to the invention of the present method. The method of the present invention is based on identifying an intermediary provider of services to the categories of end-user businesses which constitute the appropriate target audiences for the materials and utilizing existing technologies of web-hosted, password protected synchronous and asynchronous access of materials converted to SCORM and Experience API packages for use in LMS (Learning Management Systems) for subscribers. As such the present invention advances the commercial interaction with computer based technologies, in this case for paid educational purposes and training.

Accordingly, for training on safety, security, and loss prevention and all areas of loss at businesses, organizations and agencies related to reducing worker's comp claims, public liability claims, external and internal theft, sickness at the workplace, defusing of violent confrontations at the workplace, and related topics, the first step of this method is to provide materials on a subscription basis to the several dozen largest security integrators in the world or to the largest human resource and payroll service outsourcers and providers. Security integrators have sought to expand the range of their services from simple security to communications such as nursing station to doctor, work dock to administration office, and field offices to internal offices as well as emergency announcement systems, telephone systems and all forms of data integration. Further such companies may concern themselves with building automation, access control, guard and safety-escort services, cyber security and personal safety and emergency response systems.

Since integrators wish to provide a total experience for their clients and be viewed as valuable partners, the integration of an array of valuable training which these integrators may conduct to their clients fits their agenda. Human resource outsourcer companies such as ADP, Paychex and Insperity also broaden their services provided such as payroll and employee benefit services to include providing educational employee training materials to their clients. The skills of such integrators and outsourcers to develop and produce top quality educational material on their own however is very limited and an examination of many things offered reveals a complete absence of anything of high production value quality or dramatic arts. Instead, dry, jargon-laden dreary webisodes, webinars, whitepapers and Power Point presentations prevail.

In the case of the security integrators such offered educational materials would pertain to loss prevention. In the case of the human resources outsources such materials would pertain to loss prevention and may also relate to sales training, customer service and employee communications skills.

In VEHOVSKY, et. Al. US 2014/0057239 (hereinafter "Vehovsky") there is shown a method of putting training materials in a website hosted site where such content is selectable by users from a queue. This did not anticipate the use of security integrators, payroll or human resource outsourcers or other providers, whose primary business was not the selling or distribution of such materials, as distributors of the materials for a producer or seller of the materials. The object in Vehovsky essentially teaches away from the present invention insofar as it makes a wide array of materials available to a wide array of individual users or buyers or learners selecting from a queue of materials, as opposed to greatly centralizing the distribution of sold materials in a vertically integrated way in the present invention, which is the opposite. The model in Vehovsky is similar to that in stock photograph websites such as Shutterstock, Adobe Stock, iStock, and Dreamstime where a great number of photographers upload content for purchase and a great number of individual customers select, pay for and download images. Secondly the essential element of the present invention, which is that the training materials are tangentially related to the primary business of the distributor such as a payroll service or security integrator and not a core part of those businesses, is lacking or taught away from in Vehovsky. It is worth examining and exploring Vehovsky as a typical instance of prior art in order to best see by contrast the vast acceleration of sales possible in the present invention.

In CHEN, et. al., U.S. Pat. No. 6,249,281 (hereinafter "Chen") a GUI (graphical user interface) is presented which allows users or learners to interact with content via icons or graphical images instead of text based commands. Although this speaks to an element of interaction which is in the present invention in a different form, namely survey, feedback or polling questions could be presented with GUI's, the essential element of providing training in a web hosted, credentialed access system that is SCORM and Experience API conformant to work with LMS's (Learning Management Systems) and the provision of this through what is termed in the present invention the tangential distribution method related to sales through a very large integrator or provider of services only tangentially related to the subject of the content is nowhere considered or anticipated in Chen. Again, it is useful to explore Chen as a typical instance of the growing use of interaction in web based learning, however as a sales method the essential invention of the present invention is not part of Chen in the same way it is lacking from any other prior art or extant methods.

BACKGROUND OF THE INVENTION-OBJECTS AND ADVANTAGES

Despite the good efforts of OSHA, insurance company loss prevention inspectors, in-house company loss prevention, safety and security directors, educational materials available for free online or in libraries, and the efforts of consultants to business, businesses lose about fifteen percent of their revenues to multiple sources of loss including workers comp incidents both traumatic and non-traumatic and the consequential damages thereof, sickness at the workplace decreasing productivity, internal and external theft, vandalism, arson, sabotage, workplace violence and slip and falls and other public liability related losses. This is based on data and statistics culled from the F.B.I., the Commerce Department, the Labor Department, the Integrated Benefits Institute, the U.S. Chamber of Commerce, the Small Business Administration, the National Federation of Independent Businesses, the United States Fire Administration, ASIS International (formerly American Society for Industrial Security) and the insurance industry and security industry. This fifteen percent loss excludes fraud, embezzlement and work-related motor vehicle losses.

Businesses since 2014 have been earning a historically high 10% profit before taxes, up from about 6% which more typically prevailed over decades. OSHA has been effective in cutting workers comp incidents, yet a threshold of improvement has been reached where the 15% of revenues aggregate losses persist. So this means that businesses are on average earning 25% and losing about sixty percent of that to the areas of loss described above.

Safety training, for example, may be implemented by safety inspectors giving so-called tool box safety talks at construction sites. Yet the positive effect of such talks can be completely undermined if upon the inspector leaving the group of assembled workers one of them makes a sarcastic remark at the expense of the absent inspector. The definition of what is macho or not is thus rendered by the worst element of the group and the practical effect of the training is destroyed. The effectiveness of written brochures or canned instructional films to overcome this real psychological dynamic is obviously extremely limited. This is particularly true given that the production values of typical employee training materials is very low. A lecturer may be standing at a podium with drapes behind him or her on a stage. Power Point charts may be presented. This competes very poorly with the dramatic, super high-quality values of Hollywood and TV films, yet that is the standard against which a viewer's attention is challenged.

The typical company does not have the resources either of capital, time or skill to produce truly high-quality training materials or to originate materials beyond what is already well known. A seller/producer of such materials for sale to businesses, organizations and government agencies is hamstrung in its effort to achieve wide distribution by the existing typical direct sales method which is essentially door-to-door or random driving of internet traffic to its own website and the immense costs associated with that, or by the often touted but much diluted efforts of sales networking. The method described here overcomes these limitations.

There exists at least two industries, security integrators and human resource and payroll service outsourcers, which strive to provide multiple services to their clients. Yet they in turn lack the resources to originate or produce high production values materials. Other groups or bodies that currently disseminate such materials include chambers of commerce, trade associations, trade journals, online schools and industry groups.

The present invention takes advantage of the potential of these integrators and outsourcers that exist between end-user companies and producers of high quality materials. High production value training webisodes dealing with loss reduction in areas of workplace violence, sickness of workers, "presenteeism" (employees at work but sick), unlawful acts by employees, theft, public liability, workers comp, and "office politics" or dysfunctional communications between employees and between employees and management, and the developing of corporate cultural change to facilitate improved job satisfaction, teamwork, productivity and creativity is not the primary business of such security integrators or payroll or human resources outsourcers or other service providers. In this way, based on the large numbers of end-users in a tier sale and distribution via the integrators and outsourcers, it becomes economically feasible for a seller/producer to create and provide and for an end-user company albeit relatively small to obtain very high level training materials. This comprises uniquely a "tangential" method of distribution and sales because the subject matter is tangentially related to the services of such integrators and outsourcers.

For this to work it is essential that the technology of web-hosted high-definition password protected access be utilized and this technology enables this application. Additionally it is essential for the training videos produced by trainers in various formats such as MP4, MOV, WMV, FLV, AVI and other to have the digital video data in compressed form containing coded video and audio data or essence inside a container to be converted via software to SCORM and Experience API conformant format so that it will integrate seamlessly with the multitude of existing LMS (learning management systems) used by companies and industry and will continuously be maintained to meet these evolving standards. The method of this tangential distribution of training and application is not and has not been in use and yet it offers a true way to save businesses a substantial portion of profits and to save lives, prevent injuries, prevent losses and improve the quality of life of employees, managers and business owners. As a consequence of that, jobs are more secure, promotions more readily available, businesses can grow and be spared disruption, and the economy of the nation can prosper.

The advantage of transforming training videos from the multitude of formats in which they are typically recorded such as MOV, WAV, MP4 and other into the SCORM, AICC (Aviation Industry CBT Committee) (in which "CBT" signifies computer based training) and Experience API (also called "xAPI") package is that this makes the material almost universally available across the multitude of LMS's (Learning Management Systems) and provides for interoperability, tracking, feedback, polling, and editing such as adding titles, changing portions of the content without requiring extensive work. Because these standards are constantly evolving, having the content transformed into the package allows it to be updated automatically as far as the designers of the content and the learners or their employers need be concerned. Content can be made available by invitation or dispatch to learners, as selected by their employers. All such training programs can then reside in the "record store" of the LMS. In a preferred embodiment Rustici's "SCORM Engine" provides the "record store" and the SCORM player and this engine can be purchased from Rustici or paid for as a SaaS (software as a service.) The authoring tool may add icons and other preprogrammed features to the content, or the material may simply be kept in its original appearance, whereas the code of the package would allow for such additional features if selected in the future.

The method of the present invention is based on the discovery of a particular gap or threshold between supply and demand, itself a rare event, where this potential has not been utilized. It is particular to the major security integrator and the human resource outsourcing industries and for the supply of safety and security materials, and in the case of the human resource outsourcing companies also applies to sales and communications training.

An obstacle overcome in former training or that based solely on non-interactive formats such as training films, c.d.'s, or broadcasts, is that employees quickly lose the benefits of training if they do not personally engage in it in a hands-on way. Unless the presentation is very high quality it does not engage the attention of the audience and employees merely tolerate such training as a loathsome imposition or a boring session for which they must brace themselves. By contrast, in the method proposed very high level production values and post-production editing can be done. Additionally on-site practice is done and those employees most enthusiastically engaged can have their creative contributions distributed to the whole group via technologies of web-based interaction and hosted distribution. This helps to weave the audience and the presenters together but always managed through the high production value media and techniques chosen by the producers.

Accordingly actual affective and cognitive training can be accomplished in this way changing the way employees see themselves, their co-workers and their company. New skills, confidence and creativity can be evoked. Only through the massive tier-level structured distribution defined in the method of the present invention of business method is this possible and practical. Efforts of an individual security integrator or human resource provider will otherwise inevitably fall short in this respect and heretofore has fallen short. The primary focus and duty of such integrators and human resource outsourcers, respectively, is to provide security to a client or to provide human resource services such a payroll or employee benefits. Hence truly high quality, immersive training has not been possible.

In a preferred embodiment the training video, also called "webisode", will have the phone number, preferably an easy to remember one or vanity type phone number utilizing the company name of the seller of the content, or the email address of the seller of the content or of the presenter or narrator of the training, embedded or appearing throughout the video at regular intervals, inviting the learners or viewers to call or email the narrator with any questions. The reason for this is that although access is limited by credentialed passcodes or passes based on how many passes were purchased by an end customer business, there is nothing that prevents the use of video screen capture programs to obtain illicit copies. If a copyright thief did this for the purposes of reselling the content or unauthorized use they would then risk the possibility that one of the learners or audience members would contact the narrator. Since each credentialed user is recorded in the system it would be immediately obvious that this violation had occurred. Thus by this method a level of additional security is achieved.

Recognizing the emergence of this unique market approach within the security integration and payroll and human resource outsourcing industries the present invention is designed to fulfill a need that exists but which has been wanly developed and not commercially capitalized upon, namely the educational services and employee training of end users of the major integrators' and human resource outsources' services. Training, when offered by these companies, has traditionally been usually offered free or is of a specific limited nature offered to individual clients.

SUMMARY OF THE INVENTION

A business method in which web-based technology to limit access by password is administered on a subscription basis to view high definition training webisodes wherein source video has been converted by software executable on computer to SCORM and Experience API conformant formats, and is sold on an add-on basis to existing service contracts of security integrator and human resource outsourcing companies to their client bases is described whereby a much higher level of production values is made affordably practical for such training as received by the ultimate end-user customers. No prior method allowed or achieved such training capable of affective, cognitive and knowledge, skill and technique sets, further permitting quantification of results and observation of behavior and feedback.

DRAWINGS—BRIEF DESCRIPTION

Figure 2:
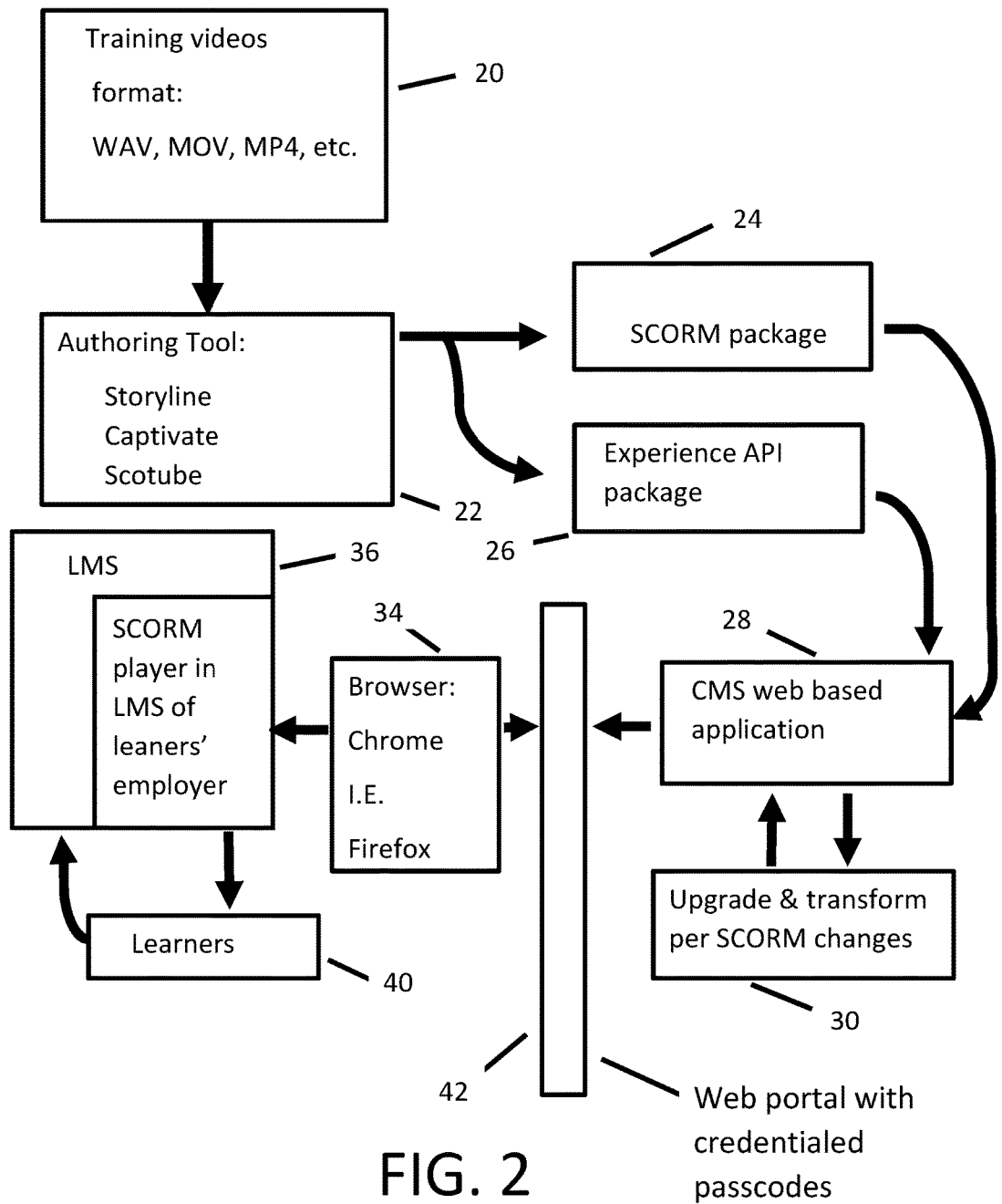

FIG. 1 shows a sequence of steps for the invention.
FIG. 2 shows additional steps.

DRAWINGS—REFERENCE NUMERALS

10 First step is identifying large security integrators, human resource and payroll service providers and outsourcers that will serve to do the tangential distribution of the training materials.
11 Second step is providing a short demo of the training video or webisode to the tangential distributors identified in Step 1.
12 Third step is forming an agreement with said tangential distributors to supply access by way of passcodes for all of their clients and to add the cost of the monthly subscription fort his to said distributors' bills to their clients, and paying a portion of the collected revenues to the producer/seller of the training materials.
13 Fourth step is the granting of the right to said tangential distributors to in turn grant to their clients the right to cancel subscription without cost for the initial webisode and to cancel the subscription at any future time, paying only for the months of utilized subscription.
20-42 Fifth step is the transforming of original source training videos 20 in formats such as WAV, MP4, MOV or other by use of an authoring tool 22 such as Storyline, Captivate or Scotube into SCORM 24 or Experience API 26 packages fusing a web based content management system 28 with automated upgrading 30 of the package to most current standards for access by learners 40 via a web portal 42 with credentialed passcodes, utilizing the learners' browser such as Chrome, I.E, or Firefox 34 and using a SCORM player 38 of the learner's LMS 36. Tracking of the learners' interaction with the material also occurs in this step.

14 Sixth step provides feedback, polling, surveys, testing, automated scoring, peer to peer interaction and leaner to teacher interaction, and training manuals and upon request deputized internal champions or expert on site trainers.

15 Seventh step provides accounting of revenues from the paid subscriptions based on the number of passes purchased by the clients of the tangential distributor. The SCORM package keeps track of this and allows for addition of new learners throughout the subscription.

16 Eighth step distributes the revenues with the larger portion going to the tangential distributor and the smaller portion to the produce r/seller of materials.

DETAILED DESCRIPTION OF THE INVENTION

The present invention has its first step 10 in identifying the major security integrators and payroll and human resource outsourcers. The term "step" as employed here is meant to indicate a logical sequence of a process which in an ideal embodiment may contain all or some of the steps named. It is not well understood or generally known in the field of employee educational training materials, or more particularly of training materials directed towards reducing all areas of business losses such as workers comp, sickness of workers, employee "presenteeism" (employees being at work, sick), unlawful acts of employees, theft of physical or intellectual property, public liability, workplace violence, so-called "office-politics" or stressful, dysfunctional communications, and related topics, that major security integrators or human resource outsourcers and payroll services, although not directly or primarily involved in the distribution of such training materials would in fact be the best method for the widest, affordable distribution of such materials. Unlike a normal channel of distribution, i.e., one in which such materials would be the primary business and focus of the distributor, it is in this case tangential or at a right angle to the primary occupations of those security integrators and payroll and human resource outsourcers. Any prior distribution of such materials to end-user businesses has therefor been of low production value and limited range.

The second step is provision of a demo video 11 available for online password limited, time-limited access, or made available by other means such as a c.d. copy or in-person presentation on a salesperson's laptop computer. Citrix, We Transfer, Rustici or other services exist which then host such high definition videos and provide password and time limited access to those granted permission. Additional useful information such as the number of times viewed if permitted for unlimited views over a limited time span, whether the full demo was viewed or what portion thereof, and answers to test or polling questions if so configured, are available through some of these services. The integrator and human resource outsourcers now preview the high quality nature of the material. This conveys some useful and essential information on a selected topic of pressing current interest but it should not give away the full range of solutions pertinent to that topic. It is in essence an intro or teaser yet it is not simply a commercial or advertisement. It is preferably a carefully edited extract of salient points so that the five or ten minutes spent viewing it should itself provide meaningful educational learning. An ideal embodiment might be six minutes in length.

Typically in such functions 14, an individual password entered participant 42, in this case being the employee of the end-user client company, will answer questions at the end of each webisode segment in a series. These answers are automatically scored and the answers of all participant employees are collated and ranked, sub-grouped, and displayed as well as individual scoring, for review by the client company 14. The software that performs this in a typical SCORM environment is well known and generic.

The hosting site, such as SCORM CLOUD allows the uploading of the training material content into a shell of a SCORM package 24 which can be imported into a learning management system (LMS) 36. Content can be selectively sent to designated or defined groups of users 40. The material, even though technically delivered to an LMS remains on the SCORM CLOUD server 28, allowing the producer/distributor of materials to make small changes 30 without having to reach out to each LMS served. Additionally the distributor is able to track use of the content even once delivered to the client's LMS 14. This hosting provides compatibility with all SCORM LMS systems 36. If a client does not pay bills their access to the content can be remotely disabled even though already delivered to the client's LMS 36. Useful information such as minutes per view of the webisode, average score of answers to the questions, percentage of participants that passed the test represented by the questions and answers, and so forth are readily available for use by the end-user client company as well as the producer or distributor of the materials.

Step Three is forming an agreement 12 where under the integrator or payroll service or human resource outsourcer 10 agrees to provide the series of training videos and associated materials to all of its clients on a no risk basis as a paid subscription but to bill them for the added service and to pay over a portion of that amount to the seller/producer of the materials. Accordingly, if the integrator or payroll service or human resource outsourcer is billing a client an average figure of, for example, $20,000 per month they may add this service for $500 extra which is an entirely nominal figure. For a typical client with 500 employees this is only $12 per year per employee, which compared to the typical $1200 per year spent on employee training is vanishingly small. Even if $5000 per year is added to a $20,000 monthly billing, representing in the above example a 25% increase, and corresponding to $100 per year per employee, it is still relatively modest. Insofar as employers typically spend about $1200 per year it would represent an excellent value.

Despite the small cost the topics are the most vital to the interest of that end user client. In this step the integrator or outsourcer also agrees to pay a portion of the proceeds 16, for example twenty-five percent, to the seller/producer of the materials and may agree to added optional ancillary services or materials. In the preferred embodiment of this step the integrator or outsourcer does not solicit a buying decision from its clients but simply announces that an invaluable service has been discovered and is being added to the monthly services on a no-obligation trial basis and at a discounted cost. Due to the quantity of end-users so aggregated in this tier based sale it is possible to greatly discount the cost compared to if it was simply sold directly to single end-user companies.

Step Four is granting permission to any end user customer company that if it wishes to discontinue the monthly webisodes 13 it simply notifies the integrator or human resource outsourcer within 30 days of the first one and the $500 billed in the example or whatever amount was in fact billed would be refunded in full. In the absence of such notice the subscription will continue to be fulfilled with monthly services and the cost of this added to the customer invoices. If at any future time the service is to be discontinued notice will immediately stop the program, so there is 100% satisfaction guaranteed. In a preferred embodiment of this step the integrator or human resource outsourcer may send courtesy reminder notices following either the first, several or each webisode asking their client if they were satisfied or do they wish to cancel. This eliminates any sense of an imposed sale or hidden cost of services and it engages the end-user clients' endorsement and ratification and emphasizes that the end-user is completely free to accept or reject the provision of the training materials.

Step Five is the provision of a series of high quality high definition fully produced webisodes 20 in SCORM 24 or Experience API 26 conformant format available for synchronous viewing by employees of an end-user customer, namely where all employee of that company would view the material at the same time, or asynchronous viewing as the end-user customer may prefer, for an unlimited or limited number of viewings as the subscription contract may provide. Additionally materials are provided for a recruited or delegated employee, referred to as "a deputized internal champion" of the end-user company to conduct on-site practice sessions 14 following provided guide books and with available full-time access to the seller/producer of the materials or its expert(s) to answer facilitation or customization questions. Further, collaborative teams may be formed to further practice, apply and develop the materials. Additionally on-site expert consultation may be deployed for the fees charged or for additional fees on an as-needed basis directed by the end-user. To accomplish Step Five the integrator or human resource outsourcer must obtain from its clients the i.p. addresses ore-mail addresses of employee end-users if individualized testing results are desired, or if confidentiality of such information is preferred then a system of limited number anonymous passes is available through CitrixShareFile or similar services.

Step Six is to provide a medium for interaction using Google Hangouts, Citrix Go to Training, Podio, webcam videos and other communicative and interactive web-based media to allow employees to present their ideas to the whole group as guided by the process. This creates an immersive training experience spread overtime 36. Such videos may also be incorporated or embedded in future produced webisodes.

Step Seven is the observation and evaluation of testing given on the materials utilizing the polling and automatically generated survey functions of Citrix Go to Webinar, SCORM CLOUD, or other hosting sites and services 14. Internal evaluation by a recruited so-called internal champion or employee leader of the onsite training further extends the ability to assess and quantify not only reaction to the materials but real change in the employees. The measuring of affective and cognitive changes as opposed to simply the acquisition of knowledge, skills or techniques can in this way be accomplished.

R3 Consultants of San Diego Calif. is a company which provides training in sales and customer service for Google, Comcast, MetLife, Hotels.com, Rogers, Avis Budget, and many others. See www.r3team.com. The Inventor is a partner in a spin-off company of R3 Consultants called R3Results, L.L.C. which will provide training on cutting losses from all areas of business. See www.r3results.com.

The president of R3 Consultants, based on extensive expertise in the field of employee training, found that training without feedback and follow-up and without interaction amongst the employees leads to rapid attenuation of the learning benefits. Accordingly Step Six, using well known devices, programs and software, achieves a way to continue, share, reinforce and further develop the learning experience in away most likely to achieve lasting and even increasing results.

The Q&A testing and polling of participant satisfaction in the materials is collated by routine and well-known processes of existing applications 14. This achieves a level of objective measurement of the success of the training. The in-person or interactive media such as Google Hang-Outs, telephone conference calls, and so forth allow a measure of more in-depth, more nuanced, affective changes and reactions.

Step Eight is the accounting of the economic consequences of the capitalization of this method 15 described above which at the first casual estimate may seem to yield very small potential. But in fact an integrator or payroll service or outsourcer may have 5000 end user clients which average 500 employees each. Accordingly the simple method above produces a gross receipt of over $300M. This is from one integrator or human resource outsourcer. The integrator or human resource outsourcer would be paid three-quarters of this and the seller/producer one-quarter.

Step Nine is the distribution of the income which can be three-quarters to the integrator or human resource outsourcer and one-quarter to the seller/producer 16. This assures a strong profit to the integrator or human resource outsourcer which has no cost to invest to develop, host or distribute the series. The ratio of the distribution of profits may vary to suit the particular requisites of inducing the large integrator or human services or payroll provider or outsourcer to form the agreement to perform the tangential distribution of the materials.

This method is based on the discovery of a particular gap or threshold between supply and demand, itself a rare event, where this potential has not been utilized. It is particular to the major security integrator and the payroll and human resource outsourcing industries and for the supply of safety and security materials, although in the case of payroll and human resource outsourcers it may also apply to the distribution of sales training materials.

CONCLUSION, RAMIFICATION AND SCOPE OF INVENTION

Thus the reader will see that the business method and instrumentality of the invention provides a fulsome, effective and needed educational opportunity for many employees and provides an unexploited capitalization of existing web technology and the computer based, software mediated transformation of video data to formats accessible to all Learning Management Systems, and an activation of previously unutilized potential for profits in the existing structural arrangement of large security integrators and human resource outsourcers to their clients. While our above description contains many specifications these should not be construed as a limitation on the scope of the invention, but rather as an exemplification of one or more preferred embodiments thereof. Where specific numbers are given, ranges of numbers may as well be applicable depending on particular circumstances. Many other variants are possible. For example other distributors of educational materials such as online universities, trade organizations, chambers of commerce, sales organizations, insurance companies and trade journal media may implement the methods of this invention.

Variations from the preferred embodiment may involve substitution of 3D virtual world training environments for the high-definition webisodes and of telephone conferences for the Google Hangouts, and so forth. Accordingly, the scope of the invention should be determined not by the embodiment(s) but by the appended claims and their legal equivalents.

The invention claimed is:
1. A computer-implemented method comprising:
a) creating educational video and interactive text materials associated with areas of loss from businesses, organizations and governmental agencies;
b) creating webisodes from said materials wherein video data and text is transformed from MP4, MOV, WAV and other video and text formats;
c) transforming said videos and text utilizing an authoring tool executed by said computer;
d) compressing said video data executed by said computer to Sharable Content Object Reference Model (SCORM) package;
e) placing said packages into a container maintained on a server;
f) maintaining said packages on said server to continuously and automatically update to current standards of SCORM;
g) maintaining interoperability of said packages for all systems of learning management systems;
h) sending said packages to a content management system web based application;
i) hosting said packages on a credentialed passcode, accessible web portal;
j) allowing for an end-user or learner of said materials to use a web browser for access;
k) providing for said materials to reside in a record store of the learning management system of a customer or subscriber;
l) providing an interactive format wherein changes are created in the learning management system of said customer or subscriber without reaching out to said learning management system;
m) disabling access to said materials remotely;
n) tracking usage on computer once delivered to said learning management system;
o) identifying large security integrators, payroll services and human resource outsourcers and other services providers to categories of end-user businesses which constitute an appropriate target audience for said materials;
p) establishing a subscription and distribution of said materials and webisodes by said security integrators, payroll services, human resource outsourcers, and other services providers and is tangentially associated to the primary business of said security integrators, payroll services, human resource outsourcers, and other services providers, to end-user businesses, organizations and agencies that are clients of said integrators, payroll services, human resource outsourcers or services providers;
q) establishing an application wherein said security integrators, payroll services, human resource outsourcers or service providers provide to said clients of said security integrators, payroll services and human resource outsourcers and other services providers the said webisodes and materials on a paid subscription wherein a cost is associated with said subscription;
r) granting permission to said end-user clients to discontinue said subscription;
s) providing via computer one of more of the group consisting of feedback, tracking, polling, surveys, collaborative groups, on-site training, customization, webcam or live presentations or Google Hangouts or other video conferencing by employees receiving training with other employees receiving training or with a creator of materials, provider or an expert or experts of said provider or said creator of said materials, or consultation with said producer or said creator of said materials or with said expert or experts, to facilitate said training;
t) said computer integrates interoperable SCORM compliant materials with observation and evaluation or testing of results selected from the group consisting of Citrix Go to Webinar, Citrix ShareFile, Captivate, Storyline, Rustici, Scotube or other hosting sites and authoring tools;
u) accounting of revenues generated by said subscription services.

2. The method of claim 1 further comprising offering a demo of said training materials in a web portal.

3. The method of claim 1 wherein the said webisodes and training materials comprises training in sales and customer service.

4. The method of claim 1 further comprising one or more of a group consisting of a phone number, a vanity phone number and an email address of said producer of said training materials is displayed at regular intervals in said webisode inviting learners or viewers to call or email with questions.

5. A computer-implemented method comprising:
a) creating educational video and interactive text materials associated with areas of loss from businesses, organizations and governmental agencies;
b) creating webisodes from said materials wherein video data and text is transformed from MP4, MOV, WAV and other video and text formats;
c) transforming said videos and text utilizing an authoring too executed by said computer;
d) compressing said video data, executed by said computer and transform said video data to Sharable Content Object Reference Model (SCORM) package;
e) placing said packages into a container maintained on a server;
f) maintaining said packages on said server to continuously and automatically update to current standards of SCORM;
g) maintaining interoperability of said packages for all systems of learning management systems;
h) sending said packages to a content management system web based application;
i) hosting said packages on a credentialed passcode, accessible web portal;
j) allowing for an end-user or learner of said materials to use a web browser for access;
k) providing for said materials to reside in a record store of the learning management system of a customer or subscriber;
l) providing an interactive format wherein changes are created in the learning management system of said customer or subscriber without reaching out to said learning management system;
m) disabling access to said materials remotely;

n) tracking usage on computer once delivered to said learning management system;

o) establishing a subscription and distribution of said materials;

p) establishing an application wherein said materials are provided to clients on a paid subscription wherein a cost is associated with said subscription;

q) granting permission to an end-user client to discontinue said subscription;

r) providing one of more of the group consisting of feedback, tracking, polling, surveys, collaborative groups, on-site training, customization, webcam or live presentations or Google Hangouts or other video conferencing by employees receiving training with other employees receiving training or with a creator of materials, provider or an expert or experts of said provider or said creator of said materials, or consultation with a producer or said creator of said materials or with said expert or experts, to facilitate said training;

s) said computer integrates interoperable SCORM compliant materials with observation and evaluation or testing of results selected from the group consisting of Citrix Go to Webinar, Citrix ShareFile, Captivate, Storyline, Rustici, Scotube or other hosting sites and authoring tools.

6. The method of claim 5 further comprising offering a demo of said training materials via a web portal.

7. The method of claim 5 wherein the said webisodes and training materials alternatively deal with training in sales and customer service instead of training in areas of loss prevention.

8. The method of claim 5 further comprising one or more of a group consisting of a phone number, a vanity phone number and an email address of said producer of said training materials is displayed at regular intervals in said webisode inviting learners or viewers to call or email with questions.

\* \* \* \* \*